United States Patent
Brown et al.

(10) Patent No.: US 11,549,383 B2
(45) Date of Patent: Jan. 10, 2023

(54) VARIABLE GEOMETRY AERODYNAMIC BLADE WITH INTEGRAL SHAPE MEMORY ACTUATION

(71) Applicant: The Boeing Company, Chicago, IL (US)

(72) Inventors: Stephen T. Brown, Seal Beach, CA (US); Frederick T. Calkins, Renton, WA (US); Sergey D. Barmichev, Kirkland, WA (US); Matthew Naimi, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 16/669,766

(22) Filed: Oct. 31, 2019

(65) Prior Publication Data

US 2021/0131295 A1     May 6, 2021

(51) Int. Cl.
| | |
|---|---|
| *F01D 7/00* | (2006.01) |
| *F01D 5/14* | (2006.01) |
| *F01D 5/28* | (2006.01) |

(52) U.S. Cl.
CPC .............. *F01D 7/00* (2013.01); *F01D 5/141* (2013.01); *F01D 5/28* (2013.01); *F05D 2240/301* (2013.01); *F05D 2250/90* (2013.01); *F05D 2260/70* (2013.01); *F05D 2300/505* (2013.01); *F05D 2300/701* (2013.01)

(58) Field of Classification Search
CPC . F01D 7/00; F01D 5/141; F01D 5/147; F01D 5/148; F01D 5/28; F05D 2240/301; F05D 2240/121; F05D 2250/90; F05D 2250/70; F05D 2260/70; F05D 2300/505; F05D 2300/701; F05B 2240/31; F05B 2280/5006; B64C 3/48; B64C 2003/445; B64C 2027/7288; B64C 27/615; B64C 3/50; B64C 23/072; B64C 3/44; B64C 9/22; B64C 2027/7283; B64C 13/50; B64C 2003/543; B64C 23/005
See application file for complete search history.

(56) References Cited

U.S. PATENT DOCUMENTS

| | | | |
|---|---|---|---|
| 9,145,198 B1 * | 9/2015 | Shome | ............... B64C 3/14 |
| 2017/0254208 A1 * | 9/2017 | Prince | ............... F01D 5/282 |
| 2017/0298758 A1 * | 10/2017 | Mears | ............... F03G 7/065 |

* cited by examiner

*Primary Examiner* — Eric J Zamora Alvarez
(74) *Attorney, Agent, or Firm* — Felix L. Fischer

(57) ABSTRACT

A variable geometry aerodynamic blade system employs a blade having a leading edge and a trailing edge. At least one shape memory alloy component is integrated in the blade for aerodynamic repositioning of one or both of the leading and trailing edges. At least one heating element interacts with the at least one shape memory alloy component to provide heating for transition between an austenitic and a martensitic phase. The at least one shape memory alloy component is responsive to the at least one heating element to alter one of a camber and twist of the blade responsive to a control signal. A control system is operatively engaged to the at least one heating element, the control system receiving a command signal and outputting the control signal responsive to the command signal.

18 Claims, 19 Drawing Sheets

VARIABLE GEOMETRY AERODYNAMIC BLADE WITH INTEGRAL SHAPE MEMORY ACTUATION

REFERENCE TO RELATED APPLICATIONS

This application is copending with U.S. patent application Ser. No. 15/904,838, entitled HYBRID TURBINE JET ENGINES AND METHODS OF OPERATING THE SAME filed on Feb. 26, 2018 and issued as U.S. Pat. No. 10,378,452 on Aug. 13, 2019, having a common assignee with the present application, the disclosure of which is incorporated herein by reference.

BACKGROUND INFORMATION

Field

This disclosure relates generally to the field of aerodynamic blades for turbine engines and, more particularly to an aerodynamic blade having integral shape memory actuation for fan blades or stator blades for turbofan or electric ducted fan engines for propulsion efficiency in takeoff and cruise, hybrid regeneration, and reverse fan thrust.

Background

Aircraft, as well as other transportation and power generation systems, employ gas turbine engines. In modern aircraft, turbofan engines with high bypass ratio fans are typically used. Electric or hybrid electric engine systems are being developed which will also employ aerodynamic fan technology. Shaping and control of blades incorporated in fans, and stator blades, is important for aerodynamic efficiency in varying operational conditions. Differing aerodynamic requirements exist for takeoff, cruise, descent and, after landing, reverse thrust.

SUMMARY

Exemplary implementations of a variable geometry aerodynamic blade system employ a blade having a leading edge and a trailing edge. At least one shape memory alloy component is integrated in the blade for aerodynamic repositioning of one or both of the leading and trailing edges. At least one heating element interacts with the at least one shape memory alloy component to provide heating for transition between an austenitic and a martensitic phase. At least one shape memory alloy component is responsive to at least one heating element to alter one of a camber and twist of the blade responsive to a control signal. A control system is operatively engaged to at least one heating element, the control system receiving a command signal and outputting the control signal responsive to the command signal.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide a variable geometry aerodynamic blade system for use in fan blades or stator blades with gas turbine or electric hybrid cores. A blade employs an integral shape memory alloy (SMA) component to alter at least one of camber or twist of the blade. Aerodynamic positioning of one or both of the leading and trailing edges of the blade is altered by a controlled heating element inducing change in the SMA component between a martensitic and an austenitic phase to induce a change of camber or twist of the blade.

Figure 1:
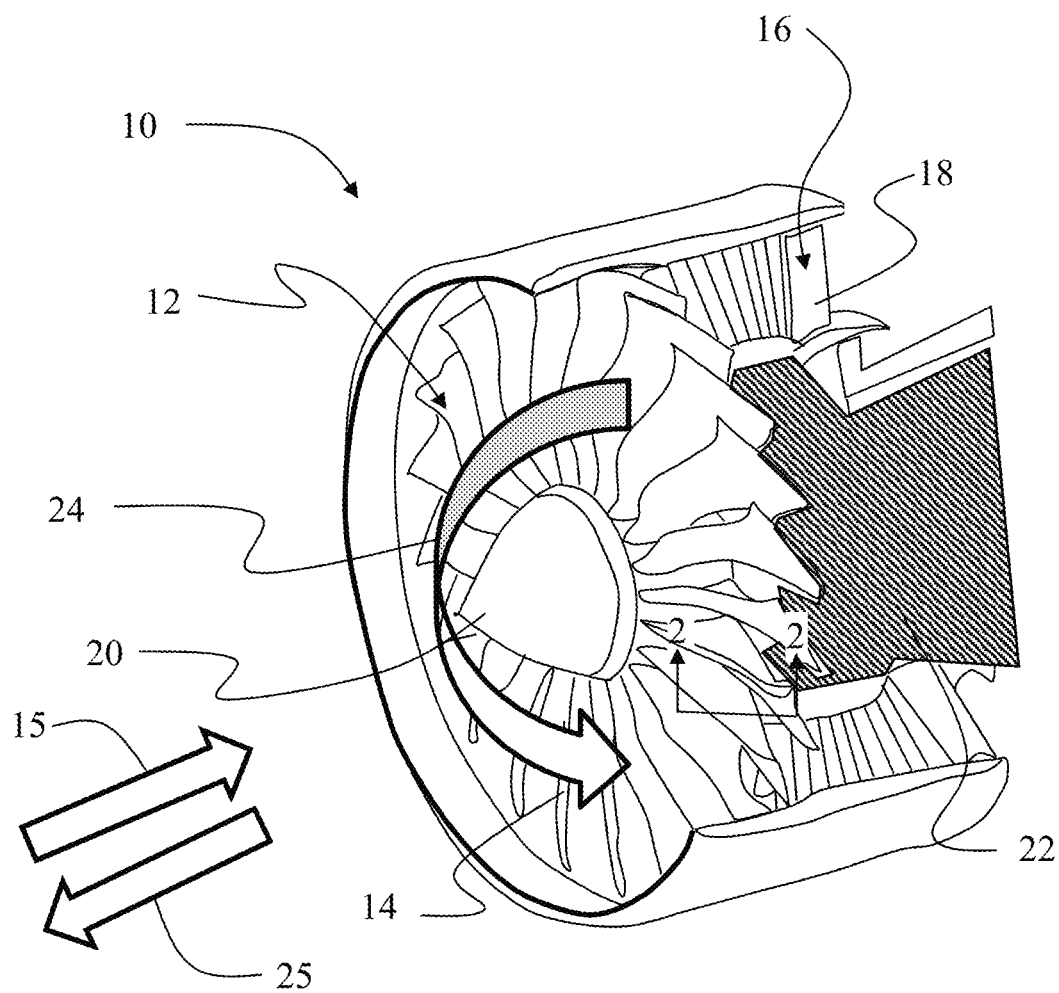
FIG. 1 is a sectioned depiction of an engine in which the present implementations may be employed.

Referring to the drawings, FIG. 1 shows an example engine 10 having a fan 12 with multiple fan blades 14. Relative wind during thrust generating operation of the engine 10 is represented by arrow 15. The terms "upstream" and "downstream" as used herein are based on the relative wind as depicted in FIG. 1. A stator row 16 with multiple stator blades 18 is positioned downstream of the fan 12. A spinner 20 is employed to smooth aerodynamic flow into the roots of the blades in the fan. A core 22 is configured to power the fan 12 and, as will be described in greater detail subsequently, may be a gas turbine or an electric/hybrid powerplant. The core is configured to rotate the fan blades 14 in a thrust rotational direction as indicated by arrow 24 for producing forward thrust represented by arrow 25.

Figure 2:
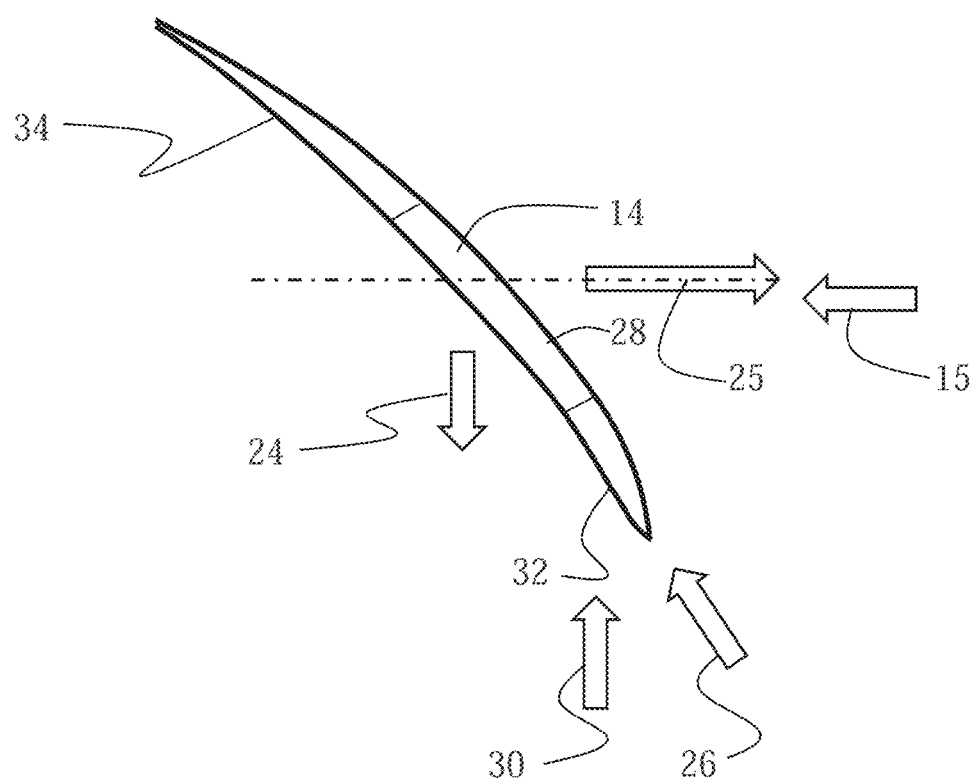
FIG. 2 is a section view of an example aerodynamic blade demonstrating takeoff incidence airflow.

A representative cross section through the fan blade 14 (along line 2-2 in FIG. 1) is shown in FIG. 2. In cruise condition for an aircraft employing the engine 10, the relative wind 15 and direction of rotation of the fan 12 result in a cruise incidence for air flow into the fan 12 with blades 14 as indicated by arrow 26. An optimal camber for the blade 14 is represented by cruise shape profile 28. However, in takeoff conditions where the magnitude of the incoming relative wind is lower and the rotational speed of the fan is higher, a takeoff incidence for the airflow into the blade is shown by arrow 30. Morphing of the shape or twist of the blade is necessary for optimal aerodynamic efficiency at the takeoff incidence.

Figure 3:
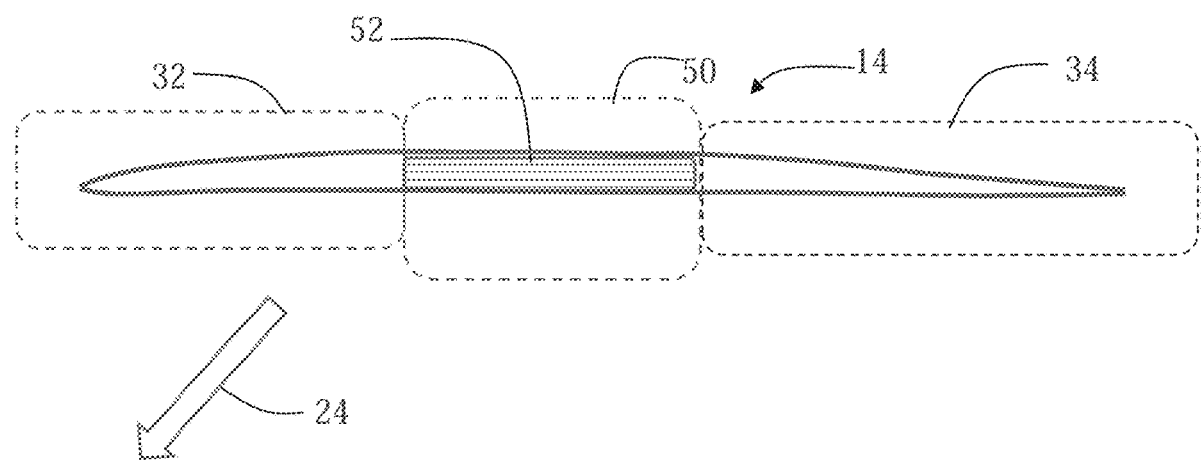
FIG. 3 is a section view of the elements of the example aerodynamic blade.

SMA morphing of blades 14 to accommodate the desired blade profiles is accomplished with several implementations. As seen in FIG. 3, each blade 14 has a central portion 50 with a core box 52. In example implementations, the core box 52 is a graphite/epoxy layup and may have a monolithic block core or may be a box having a central cavity. The leading edge portion 32 of the blade 14 extends forward from the core box 52 and the trailing edge portion 34 of the blade extends aft from the core box.

Figure 4:
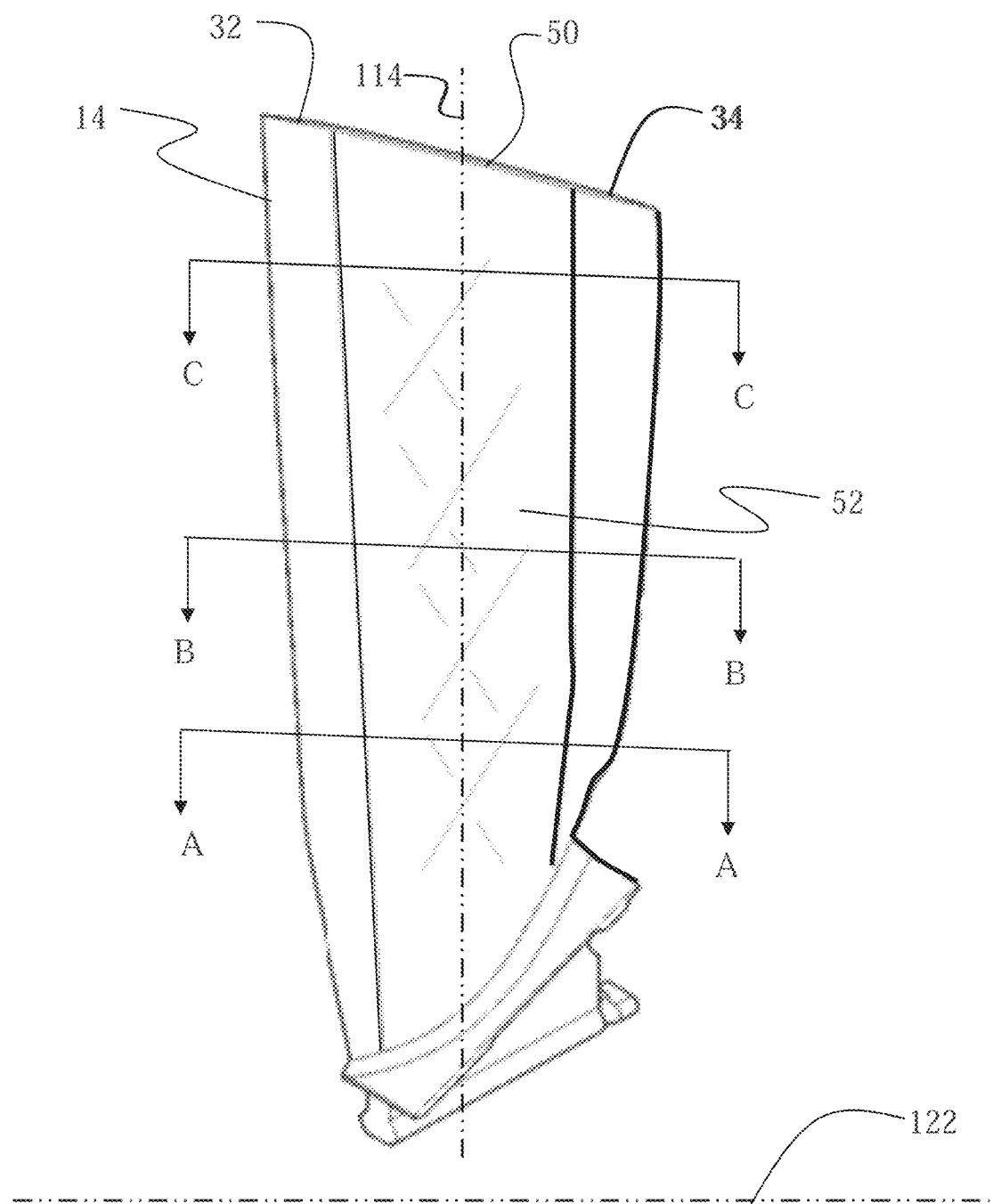
FIG. 4 is a pictorial representation of an aerodynamic blade with a first shape memory alloy (SMA) component in a shear panel core box.
Figure 5:
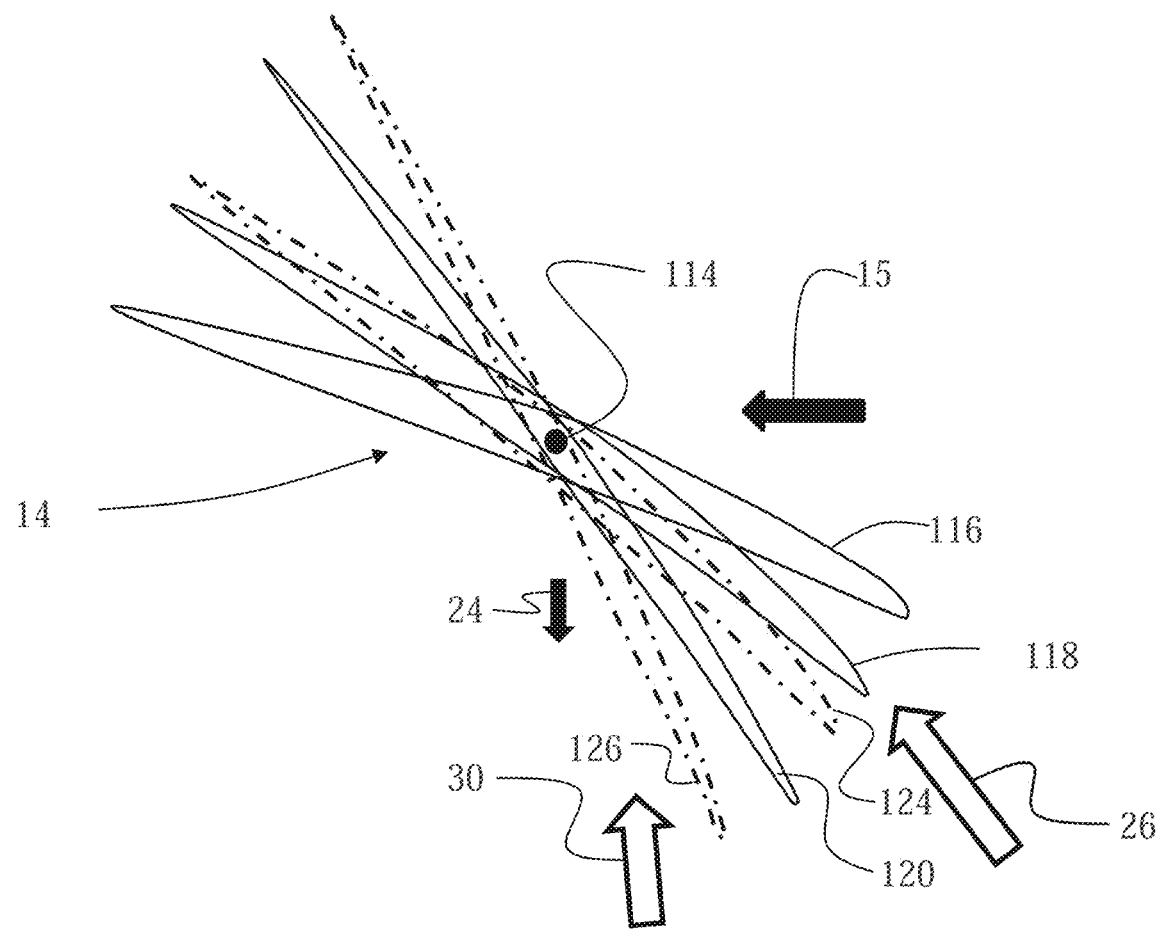
FIG. 5 is a representation of multiple sections of the blade of FIG. 4 along lines A-A, B-B and C-C in both the austenitic phase of the SMA shear panel core box and a first trained martensitic phase providing twist of the blade.

Aerodynamic repositioning of the leading edge portion and trailing edge portion in an example implementation is accomplished by altering twist of the blade 14. As seen in FIG. 4, the central portion 50 and the associated core box 52 of the blade 14, the leading edge portion 32 and the trailing edge portion 34 have a root to tip twist which results in an altered angle of attack at longitudinal positions along a radial axis 114 of the blade 14. The blade profiles at sections A-A, B-B and C-C are seen in FIG. 5 as root cruise profile 116, mid cruise profile 118 and tip cruise profile 120 optimized for aerodynamic performance in the cruise condition with the relative wind directed at the blade 14 at cruise incidence 26. Note that the initial twist in the blade 14 accommodates the change in relative incidence of flow at the sections A-A, B-B and C-C which varies as a result of the increasing velocity of the blade section at greater distances from the rotation axis 122 of the fan 12 due to rotation of the blade 14.

For airflow with takeoff incidence 30, greater twist is induced in the blade 14 with a first SMA component employing SMA shear panels in the core box 52, to be described in greater details subsequently, to position the blade profiles at sections B-B and C-C as shown by mid takeoff profile 124 and tip takeoff profile 126. The blade profile at section A-A nearest the blade root remains substantially constant.

Figure 6:
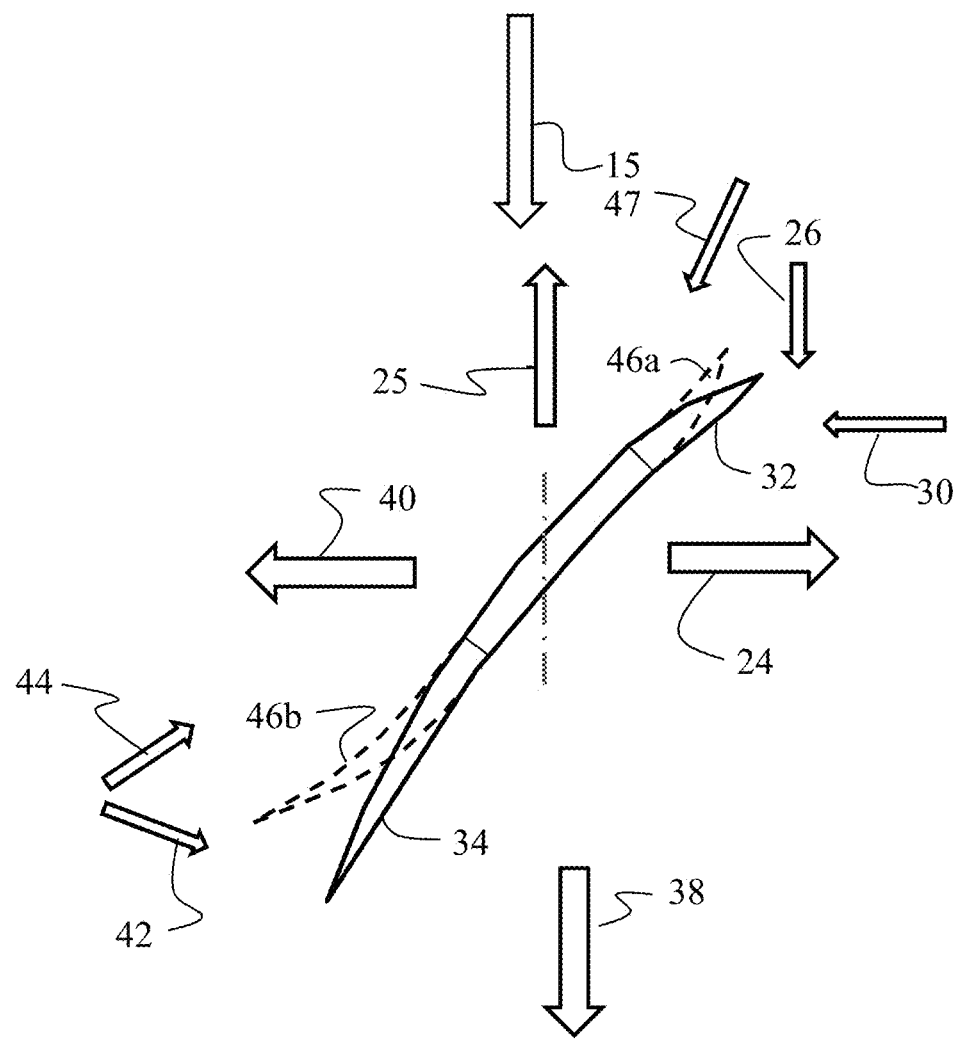
FIG. 6 is a section view of the aerodynamic blade with a second SMA component in the leading edge portion and a third SMA component in the trailing edge portion for reverse thrust/windmilling operation.

For an engine 10 with an electric hybrid core 22 additional configurations for the shape of the blades 14 are desirable. For an unclutched electric fan drive in core 22, reverse thrust 38 is accommodated by reversing the direction of rotation of the fan 12. As shown in FIG. 6, a reverse thrust rotation direction represented by arrow 40 is opposite the normal forward thrust rotational direction 24 producing reverse thrust 38 Reversing the direction of rotation of the fan 12 to the reverse thrust rotation direction 40 results in an incident flow substantially opposite to the cruise incidence 26 in the cruise condition or takeoff incidence 30 in the takeoff condition. At initial touch down with high forward velocity of the aircraft, initial reverse thrust incidence is represented by arrow 42. As forward velocity of the aircraft is reduced, a final reverse thrust incidence represented by arrow 44 is present. For enhanced aerodynamic efficiency in the reverse thrust condition, morphing of the profile of the leading edge portion 32 with a second SMA component, to be described in greater detail subsequently, and trailing edge portion 34 with a third SMA component, to be described in greater detail subsequently, for a reverse camber, as shown by leading edge portion reverse camber profile 46a and trailing edge portion reverse camber profile 46b, is induced.

Similarly, for a hybrid electric core, employing windmilling energy of the fan 12 during descent of the aircraft to charge electrical storage systems is desirable. As seen in FIG. 6, during descent a windmill incident flow 47 is present based on the velocity of the relative wind 15 and reduced thrust rotational direction 24. As in the reverse thrust case, to enhance aerodynamic efficiency and prevent separated flow from the leading edge portion of the blade due to the windmill incidence, morphing of the profiles of the leading and trailing edge portions 32, 34 of the blade 14 for a reverse camber to provide leading edge portion reverse camber profile 46a and trailing edge portion reverse camber profile 46b is induced, as in the reverse thrust case.

Figures 7A, 7B:
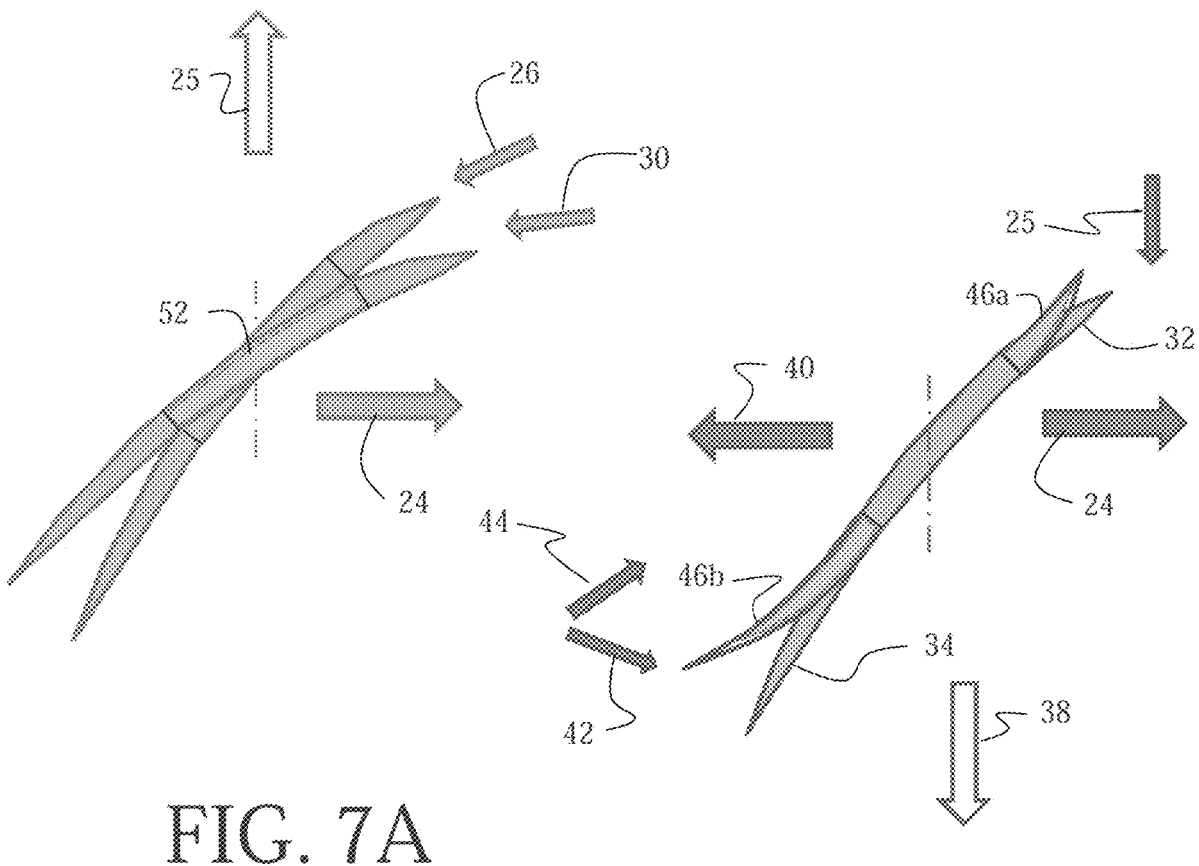
FIG. 7A is a section view demonstrating twist of the core box by the first SMA component to increase twist for takeoff conditions.
FIG. 7B is a section view demonstrating morphing of the leading edge portion by the second SMA component and trailing edge portion by the third SMA component for reverse thrust/windmilling operation.

In an example implementation of a fan 12 with SMA controllable blades 14 to accommodate takeoff conditions and reverse thrust or windmilling conditions, configuration of the blades for takeoff is accomplished by increasing twist of the blade with activation of the first SMA component in the core box 52 as shown in FIG. 7A and previously described with respect to FIG. 5. For reverse thrust or windmilling conditions, activation of the second SMA component in the leading edge portion 32 and the third SMA component in the trailing edge portion 34 provides the desired reverse camber profiles 46a and 46b, as shown in FIG. 7B.

Figure 8:
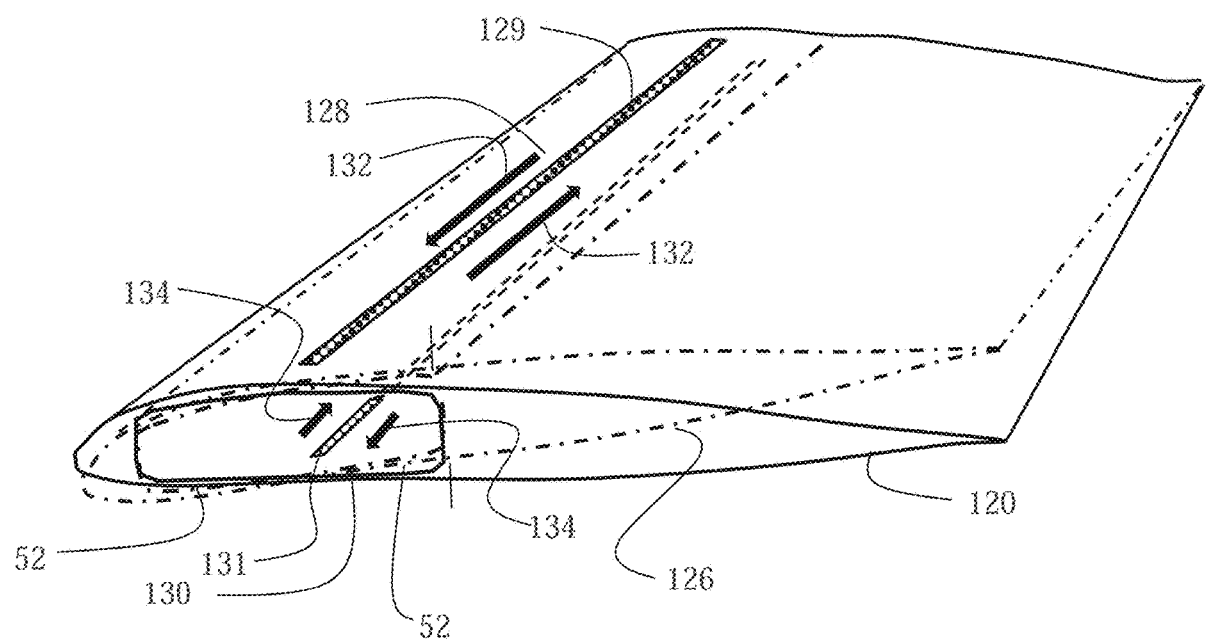
FIG. 8 is a pictorial view of the blade and core box demonstrating increasing twist by operation of the SMA shear panels of the first SMA component?

The first SMA component implemented in the core box 52 is seen in FIG. 8. SMA shear panels 128 and 130 are fabricated into the core box 52 (shown in a horizontal position in the drawing) with associated heating elements 129 and 131. With the first and second SMA shear panels 128, 130 in a martensitic phase, the core box shape places the blade 14 in the cruise profile (for example tip cruise profile 120). The SMA shear panels 128 and 130 are configured to provide oppositely oriented shear couples 132, 134 to enhance twisting of the core box 52. Heating the SMA shear panels 128, 130 to the austenitic phase causes shear motion of the SMA shear panels 128 and 130 resulting in a twist of core box 52 and resulting twist of the blade to position the blade profiles in the takeoff position (for example tip takeoff profile 126).

Figure 9:
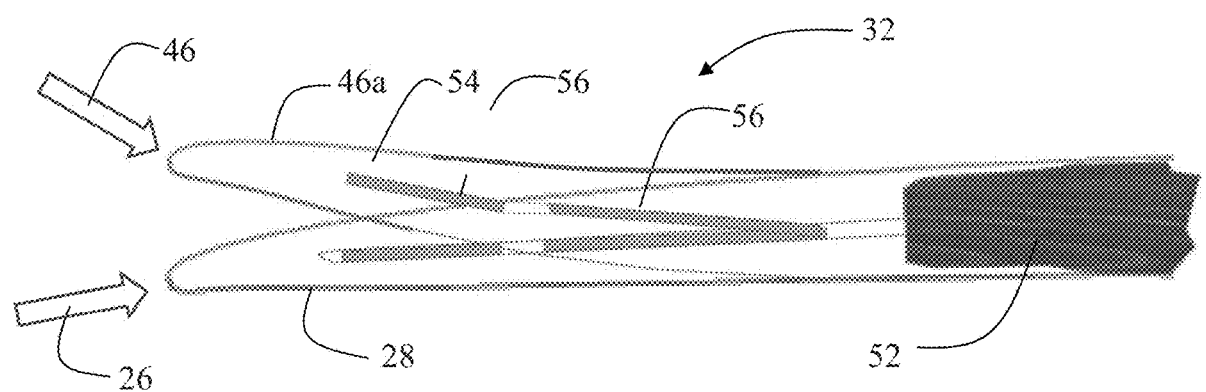
FIG. 9 is a partial section view of the leading edge portion of the aerodynamic blade showing the second SMA component in the austenitic phase and a second trained martensitic phase.
Figure 10:
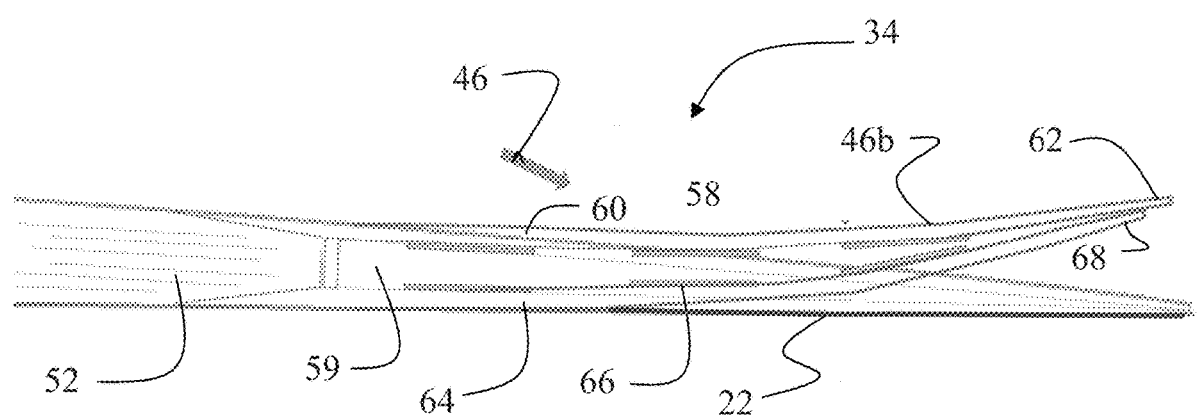
FIG. 10 is a partial section view of the trailing edge portion of the aerodynamic blade showing the third SMA component in the austenitic phase and a second exemplary trained martensitic phase.

Accommodating the reverse thrust or windmilling condition with the second and third SMA components is shown in FIGS. 9 and 10. As seen in FIG. 9, the leading edge portion 32 includes a second SMA component formed by a SMA edge 54 bonded to the core box 52 as a leading edge. A first plurality of heating elements 56 are enclosed within the SMA edge 54. The first plurality of heating elements 56 may be an electrical heating element or a liquid or bleed air hot bleed conduit configured to receive heated fluid or air directly as bleed from hot elements of the core 22 or via heat exchangers receiving heat from the core. The bonded SMA edge 54 is a formed SMA plate such as nickel titanium Halfnium (NiTiHf) having a martensitic phase with a resulting unmorphed shape for the cruise condition providing the shape profile 28 as previously discussed. Upon heating by the first plurality of heating elements 56, the bonded SMA edge transitions to an austenitic phase. The pretrained shape for the austenitic phase of the bonded SMA edge 54 morphs the bonded SMA edge into a reverse camber for the reverse camber profile 46a.

For the trailing edge portion 34 as seen in FIG. 10, an upstream trailing edge skin 58 of formed SMA plate extends from the core box 52 engaged by a second plurality of heating elements 60. The upstream trailing edge skin 58 terminates in an upstream trailing edge 62. A downstream trailing edge skin 64 of formed SMA plate also extends from the core box 52 with a third plurality of heating elements 66 and terminates in a downstream trailing edge 68. The upstream trailing edge 62 and the downstream trailing edge 68 meet in sliding contact. The upstream trailing edge skin and downstream tailing edge skin form a trailing edge for the blade. As for the first SMA component, the heating elements 60 and 66 may be an electrical heating element or a liquid or bleed air conduit. The upstream trailing edge skin 58 and downstream trailing edge skin 64 have a martensitic phase with an unmorphed shape for the cruise condition consistent with the cruise shape profile 28. Upon heating by the heating elements, the upstream trailing edge skin 58 and downstream trailing edge skin 64 transition to an austenitic phase morphing to a pretrained shape providing the reverse camber profile 46b for the trailing edge portion 34. The upstream trailing edge 62 and downstream trailing edge 68 meet and are displaced in sliding contact to avoid buckling of the skins. The pretrained shape for the austenitic phase of the upstream trailing edge skin 58 and downstream trailing edge skin 64 morphs the trailing edge skins into a reverse camber for the reverse camber profile 46b.

Figure 11:
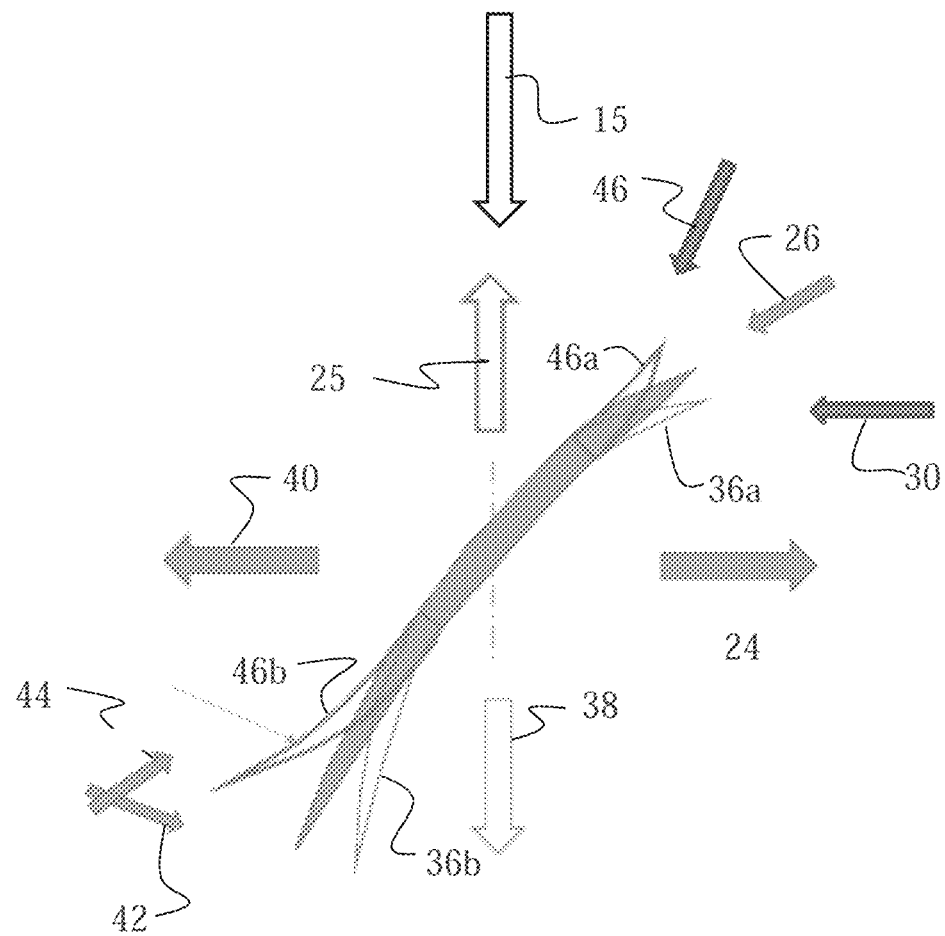
FIG. 11 is a section view depicting morphing of the leading and trailing edge portions for both increased and decreased camber.
Figure 12:
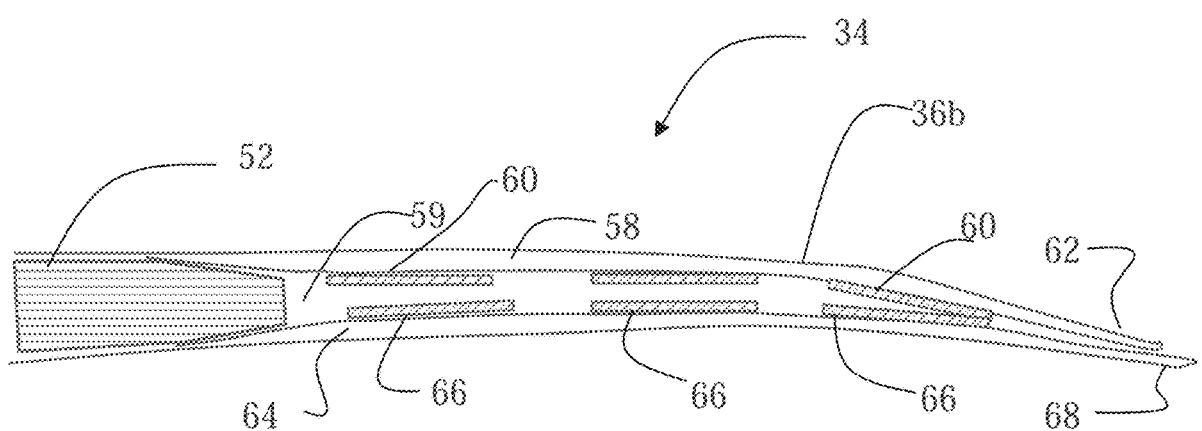
FIG. 12 is a partial section view of the trailing edge portion of the aerodynamic blade showing the third SMA component configured for both increased and decreased camber and morphed to the takeoff position.

An alternative implementation to accommodate a requirement for both takeoff conditions and reverse thrust or windmilling conditions by morphing the leading edge portion and trailing edge portion for both takeoff and reverse camber may be achieved as shown in FIG. 11. In the trailing edge portion 34, the upstream trailing edge skin 58 may be trained in the austenitic phase for a positive camber change as shown in FIG. 12 while the downstream trailing edge skin 64 may be trained in the austenitic phase for a reverse camber change as previously shown in FIG. 10. An insulating plenum 59 separates a sufficient portion of the upstream trailing edge skin 58 and downstream trailing edge skin 64 to avoid inadvertent heating by the plurality of heating elements associated with the opposing skin. Activation of the second plurality of heating elements 60 then transitions the upstream trailing edge skin 58 to the austenitic phase morphing the upstream trailing edge skin into the pretrained positive camber position. The downstream trailing edge skin 64, remaining in the martensitic phase, is urged in bending by the sliding contact of the upstream trailing edge 62 to conform to the desired takeoff profile 36b. Similarly, activation of the third plurality of heating elements 66 transitions the downstream trailing edge skin 64 into the austenitic phase morphing the downstream trailing edge skin into the pretrained reverse camber position. The upstream trailing edge skin 58 remains in the martensitic phase and is urged in bending by the sliding contact of the downstream trailing edge 68 to conform to the desired reverse camber profile 46b.

Figure 13:
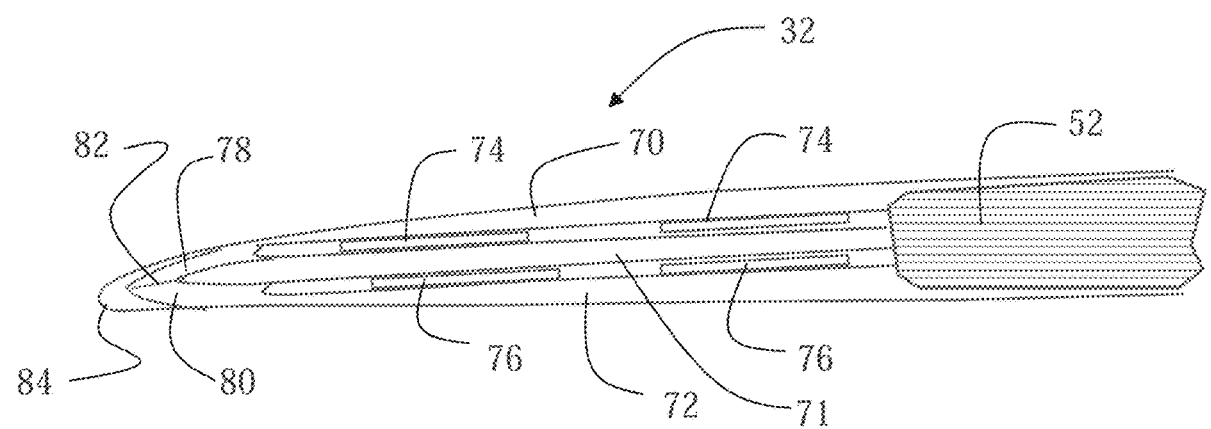
FIG. 13 is a partial section view of the leading edge portion of the aerodynamic blade showing a fourth SMA component configured for both increased and decreased camber.

For accommodating both takeoff conditions and reverse thrust or windmilling conditions with the leading edge portion 32, a similar approach to that described for the trailing edge portion 34 with respect to FIGS. 10 and 12 for a fourth SMA component is shown in FIG. 13. A SMA upstream leading edge skin 70 and a SMA downstream leading edge skin 72 extend from the core box 52 spaced by an insulating plenum 71. A fourth plurality of heating elements 74 are associated with the upstream leading edge skin 70 and a fifth plurality of heating elements 76 are associated with the downstream leading edge skin 72. An upstream leading edge tip 78 of the SMA upstream leading edge skin 70 and a downstream leading edge tip 80 of the SMA downstream leading edge skin 72 meet at an interface 82. In certain implementations, the upstream and downstream leading edge tips may be spaced distal from the third and fourth pluralities of heating elements such that a non-morphing zone proximate the tips is present allowing the tips to be joined at the interface 82 mechanically, such as by welding, or adhesively. In alternative implementations the upstream and downstream leading edge tips 78, 80 meet in sliding contact at the interface 82. A flexible cap or sleeve 84 may be affixed to the upstream and downstream leading edge tips to prevent any aerodynamic gap induced by the sliding relative positions of the leading edge tips.

Figure 14:
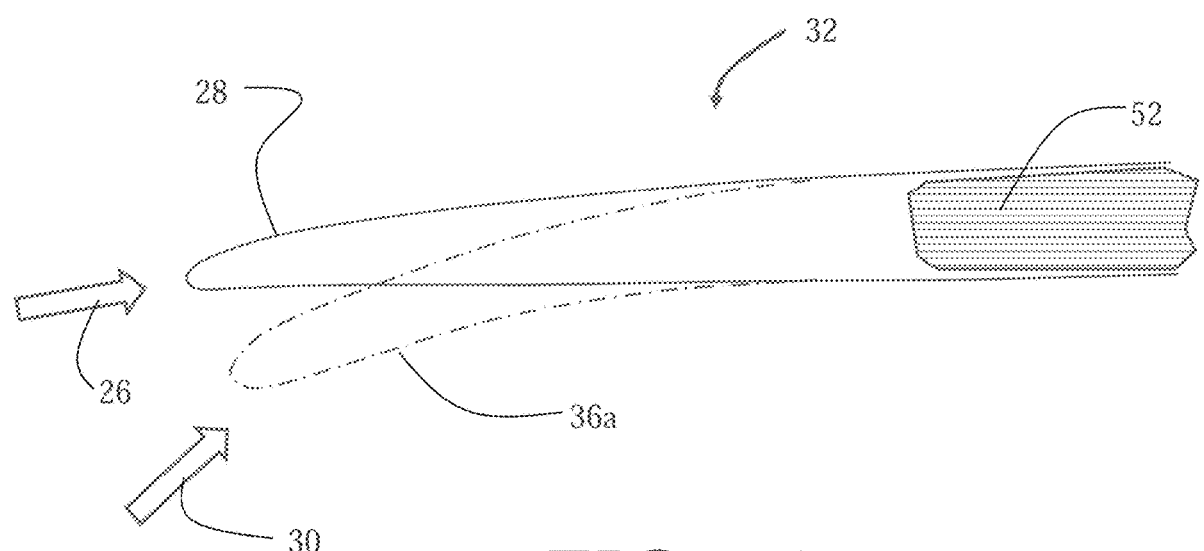
FIG. 14 is a partial section view of the leading edge portion morphed to increased camber for a takeoff position.

The SMA upstream leading edge skin 70 may be pretrained in the austenitic phase for a positive camber change as shown in FIG. 14 while the SMA downstream leading edge skin 72 may be pretrained in the austenitic phase for a reverse camber change as shown in FIG. 9. Activation of the fourth plurality of heating elements 74 then transitions the SMA upstream leading edge skin 70 to the austenitic phase morphing the upstream leading edge skin into the pretrained positive camber position. The SMA downstream leading edge skin 72, remaining in the martensitic phase, is urged in bending by the contact of the upstream leading edge tip 78 at the interface 82 to conform to the desired takeoff profile 36a. Similarly, activation of the fifth plurality of heating elements 76 transitions the SMA downstream leading edge skin 72 into the austenitic phase morphing the SMA downstream leading edge skin into the pretrained reverse camber position. The SMA upstream leading edge skin 70 remains in the martensitic phase and is urged in bending by the sliding contact of the downstream trailing edge 68 to conform to the desired reverse camber profile 46a.

Figure 15:
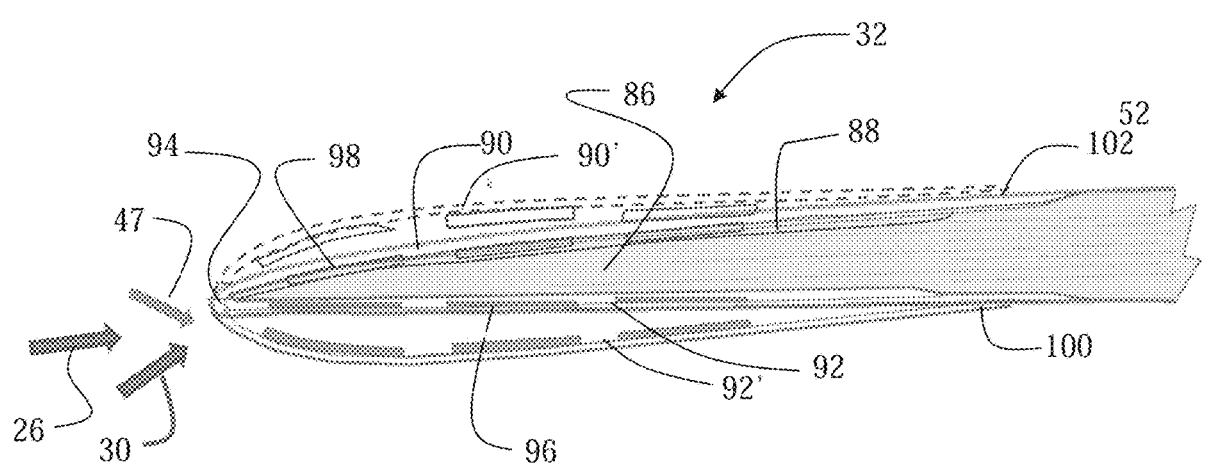
FIG. 15 is a partial section view of the leading edge portion showing a fifth SMA component configured for both increased and decreased camber.

In certain applications, a change in net camber of the leading edge portion 32 may be accomplished by increasing the thickness by inducing increased surface curvature in either the upstream surface or downstream surface to prevent separation of flow. For a fifth SMA component as seen in FIG. 15, the core box 52 extends into the leading edge portion 32 with a forward core 86. An inner skin 88 is bonded to the forward core 86 and SMA flex skins, upstream flex skin 90 and downstream flex skin 92, are fixed to the inner skin 88 proximate the leading edge 94 by mechanical attachment such as by welding or adhesively attached. A sixth plurality of heating elements 96 are associated with the upstream flex skin and a seventh plurality of heating elements 98 are associated with the downstream flex skin. In the martensitic phase the SMA flex skins conform to the cruise shape profile 28. To accommodate the windmill condition, for example, the downstream flex skin 92 is heated by the seventh plurality of heating elements 98 and in transitioning to the austenitic phase morphs into a pretrained increased curvature, represented as 92' to reduce separation of the flow at windmill incident flow 47. A downstream flex skin trailing edge 100 remains in sliding contact with the inner skin 88 during chordwise contraction of the downstream flex skin to the increased curved shape.

Similarly, to accommodate the takeoff condition, upstream flex skin 90 is heated by the sixth plurality of heating elements 96 and in transitioning to the austenitic phase morphs into a pretrained increased curvature, represented as 90', to reduce separation of the flow at takeoff incidence 30. An upstream flex skin trailing edge 102 remains in sliding contact with the inner skin 88 during chordwise contraction of the upstream flex skin to the increased curved shape.

Figure 16:
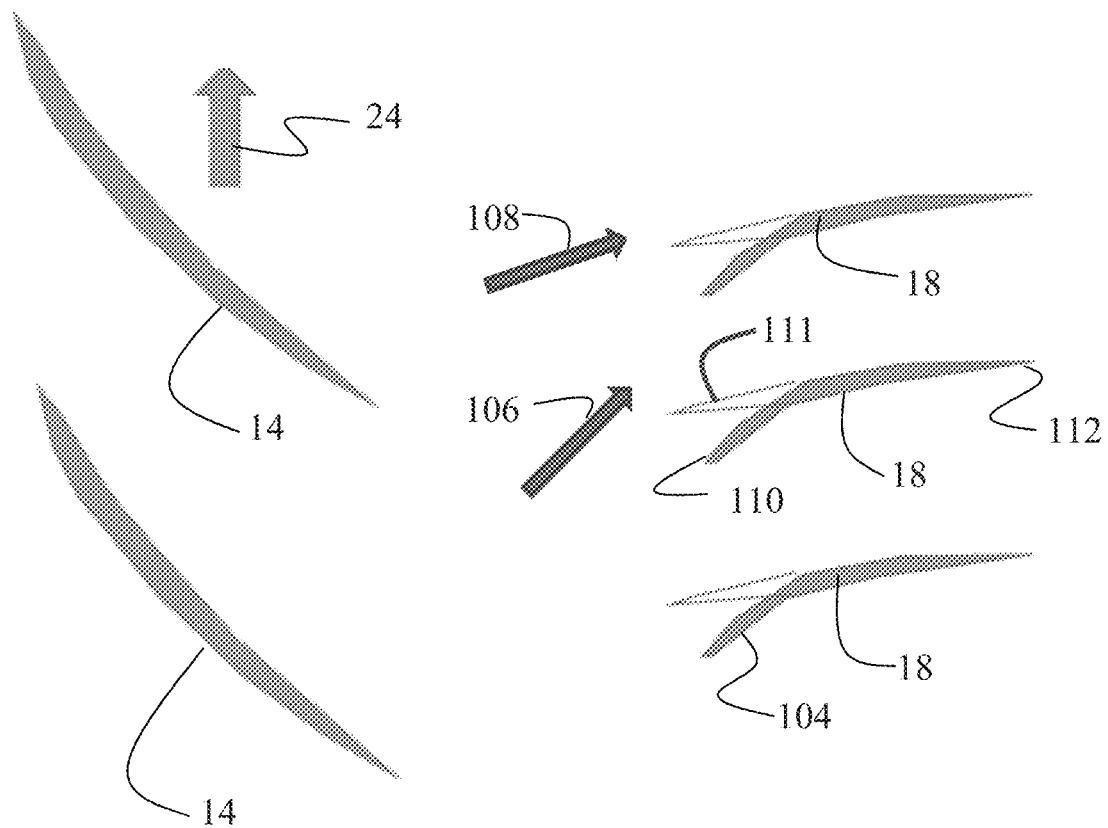
FIG. 16 is a section view of an engine fan and stator row demonstrating leading edge morphing of the stator blades to accommodate a failure condition in the fan.

While described with respect to the blades 14 of the fan 12, the stator blades 18 also may require shape modification to accommodate changing flow requirements. Particularly in a failure condition of the fan 12 where rotation may be stopped or significantly reduced, alteration from a normal operating profile 104 for the stator blades 18, as seen in detail in FIG. 16, is needed to accommodate a change from the normal operating incidence of the airflow represented by arrow 106 created by the blades 14 to a modified operating incidence represented by arrow 108 in a condition where the blades 14 are stationary. A reduced or reverse camber for a stator leading edge portion 110, similar to that disclosed in FIG. 9 for the blade 14, to achieve a profile 111 is necessary to reduce drag created by the stator blades 18 thereby reducing fuel consumption for the aircraft as a whole. Tailoring of both the stator leading edge portion 110 and a stator trailing edge portion 112 may be desirable to provide highest aerodynamic efficiency of the stator blades 18 in controlling downstream flow in the engine.

Figure 17:
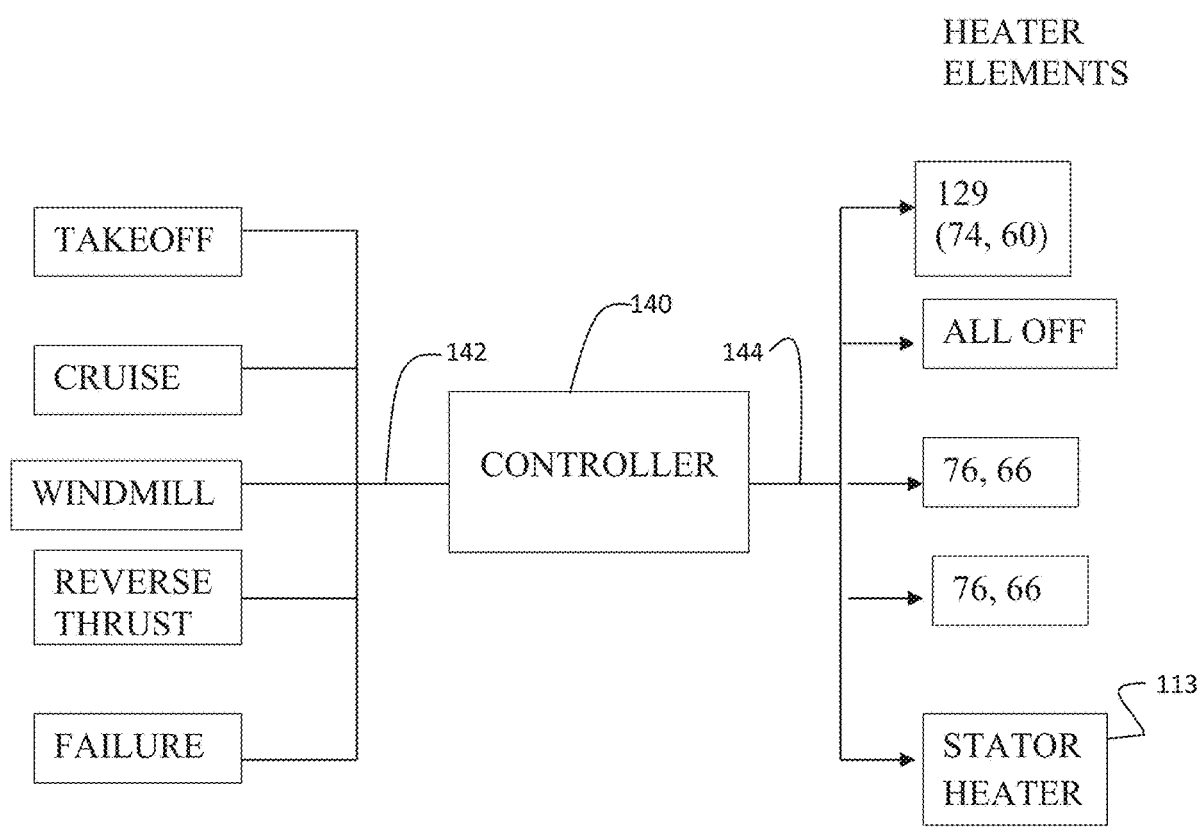
FIG. 17 is a block diagram of the control system for the SMA components.

A control system is operatively engaged to the heating elements to obtain desired modification of the blade shape by camber or twist as described is shown in FIG. 17. A controller 140 receives a command signal 142 as a position command for one of takeoff, cruise, windmill, reverse thrust or failure mitigation which may be generated manually by a pilot or may be generated in response to an engine condition such as rotational speed or thrust or a combination of engine condition and flight parameters such as airspeed and altitude. In response to the command signal 142 the controller 140 issues a control signal 144 to energize or deenergize heating elements associated with the appropriate SMA component inducing the SMA component to morph to the desired configuration. Energizing or deenergizing may be switching electrical power to electric heating elements or controlling flow of hot bleed to heating element conduits. For example, with a command signal 142 of takeoff, the controller 140 energizes heating elements 129 associated with SMA shear panel 128 in the core box to increase the twist of the blade 14, as previously described with respect to FIGS. 4, 5, 7A and 8. Alternatively, for the takeoff command signal, the controller 140 energizes the second plurality of heating elements 60 as described with respect to FIGS. 11 and 12 for the trailing edge and the fourth plurality of heating elements 74 as described with respect to FIG. 13 for the leading edge to obtain a positive camber change. In response to a cruise command, the controller 140 deenergizes all heating elements allowing the various SMA components to return to their unmorphed states. In response to a windmill or reverse thrust command, the controller energizes the fifth plurality of heating elements 76 in the third SMA component in leading edge portion 32 and the third plurality of heating elements 66 in the second SMA component in trailing edge portion 34 as previously described with respect to FIGS. 6, 7B, 9 and 10. For a windmilling or reverse thrust command, the controller 140 energizes the first plurality of heating elements 56 in the leading edge as previously described with respect to FIG. 9 or the fifth plurality of heating elements 76 as previously described with respect to FIG. 13. For the trailing edge, the controller 140 energizes the third plurality of heating elements 66 as described with respect to FIG. 10 to obtain a reverse camber change. In response to a failure mitigation command, the controller 140 energizes heating elements 113 associated with the stator blades 18 to provide appropriate shaping modification of the stator blades.

Figure 18:
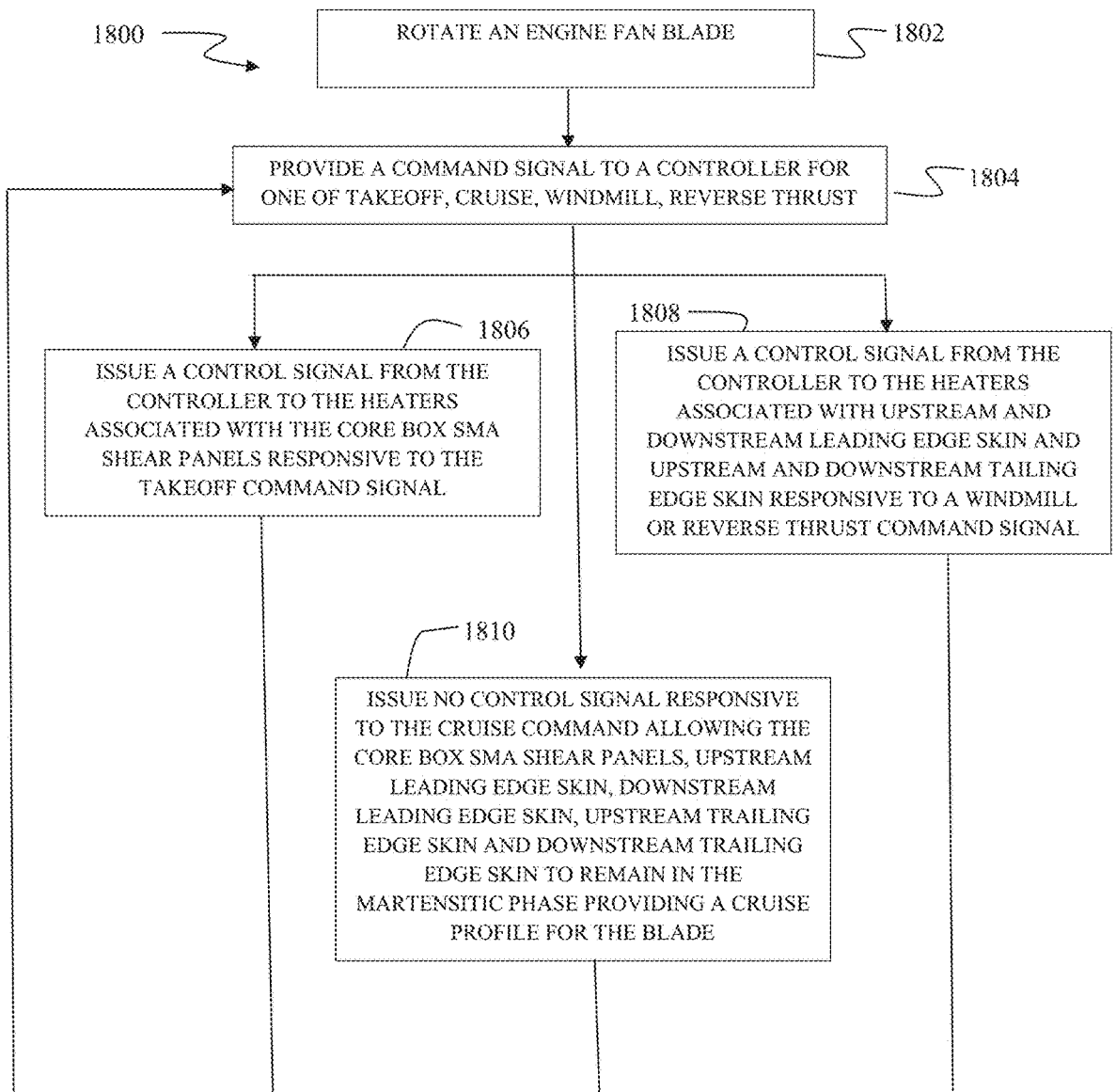
FIG. 18 is a flow chart of a method for aerodynamic blade geometry modification employing the disclosed implementations; and, FIG. 19 is a flow chart of an alternative method for aerodynamic blade geometry modification employing the disclosed implementations.

The implementations disclosed provide a method 1800 for aerodynamic blade geometry modification as shown in FIG. 18. A blade is rotated, step 1802, with a core box 52 having SMA shear panels 128, 130, an upstream leading edge skin 70 and a downstream leading edge skin 72, an upstream trailing edge skin 58 terminating in an upstream trailing edge 62, and a downstream trailing edge skin 64 terminating in a downstream trailing edge 68. The core box 52 having SMA shear panels 128, 130 is responsive to a control signal to twist the blade 14 from a cruise condition for enhanced aerodynamic performance in a takeoff condition. The upstream leading edge skin and downstream leading edge skin each have a martensitic phase with a resulting unmorphed shape for a cruise condition providing a cruise shape profile 28. The upstream leading edge skin and downstream leading edge skin each transition to an austenitic phase responsive to a control signal. The upstream and downstream leading edge skins morph to a reverse camber profile 46a responsive to the control signal for windmill operation. Similarly, the upstream trailing edge skin and downstream trailing edge skin each have a martensitic phase with a resulting unmorphed shape for a cruise condition providing the cruise shape profile. The upstream trailing edge skin and downstream trailing edge skin each transition responsive to the control signal to an austenitic phase. The upstream trailing edge and downstream trailing edge morph to a reverse camber profile 46b responsive to the control signal. A command signal 142 is provided to a controller 140 for one of takeoff, cruise, windmill, reverse thrust, step 1804. The control signal is issued from the controller to the heating elements 129 associated with the core box SMA shear panels 128, 130 responsive to the takeoff command signal, step 1806. The control signal 144 is issued from the controller to the heating elements 76, 66 associated with upstream and downstream leading edge skin and upstream and downstream tailing edge skin responsive to a windmill or reverse thrust command signal, step 1808. The controller 140 issues no control signal responsive to the cruise command allowing the core box SMA shear panels, upstream leading edge skin, downstream leading edge skin, upstream trailing edge skin and downstream trailing edge skin to remain in the martensitic phase providing a cruise profile for the blade, 1810.

Figure 19:
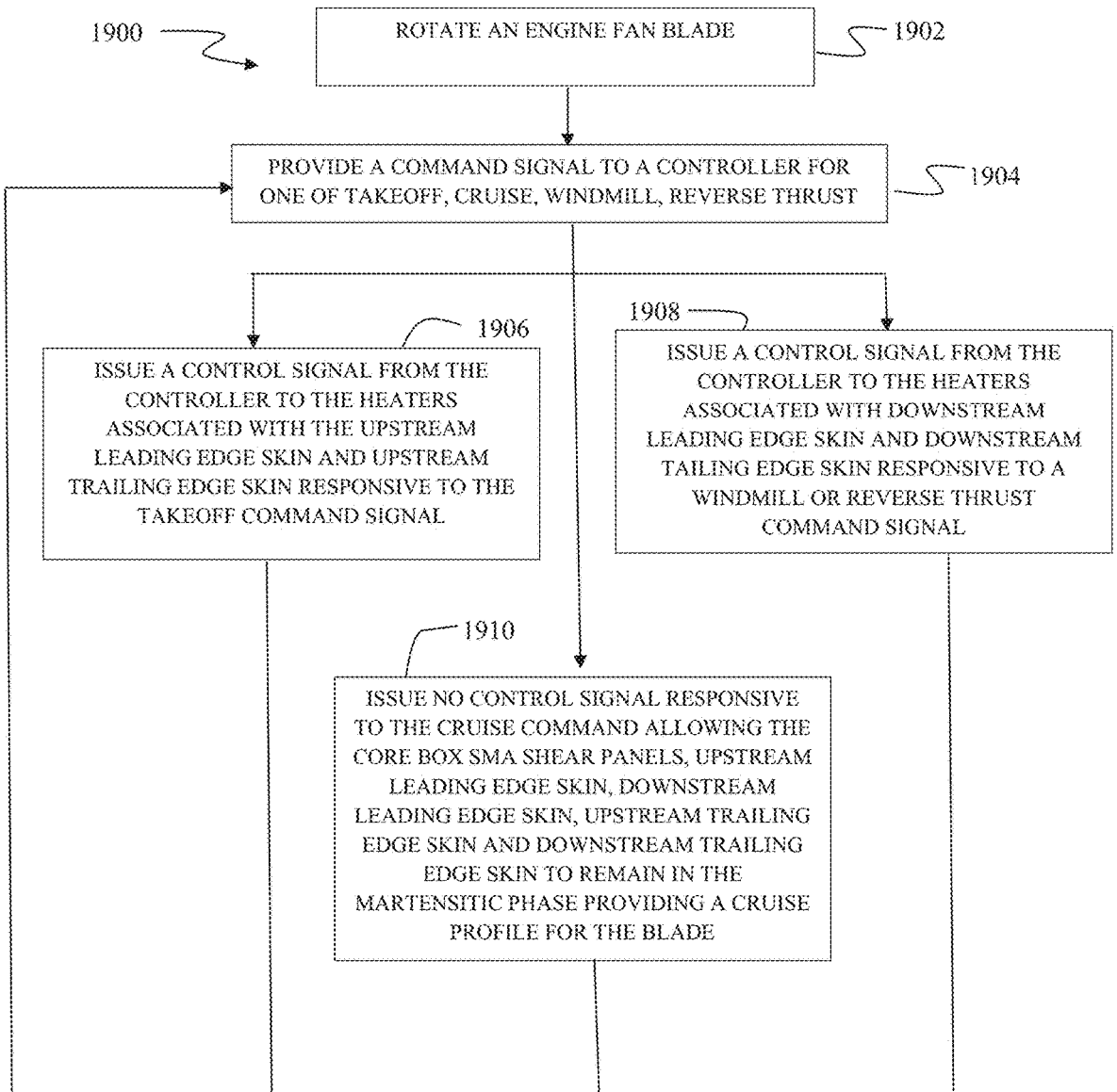

The implementations disclosed provide an alternate method 1900 for aerodynamic blade geometry modification as shown in FIG. 19. A blade is rotated, step 1902, with a core box 52, an upstream leading edge skin 70 and a downstream leading edge skin 72, an upstream trailing edge skin 58 terminating in an upstream trailing edge 62, and a downstream trailing edge skin 64 terminating in a downstream trailing edge 68. The upstream leading edge skin and downstream leading edge skin each have a martensitic phase with a resulting unmorphed shape for a cruise condition providing a cruise shape profile 28. The upstream leading edge skin and downstream leading edge skin each transition to an austenitic phase responsive to a control signal. In the austenitic phase, the upstream leading edge skin morphs to a takeoff profile 36a responsive to the control signal while the downstream leading edge skin morphs to a reverse camber profile 46a responsive to the control signal. Similarly, the upstream trailing edge skin and downstream trailing edge skin each have a martensitic phase with a resulting unmorphed shape for a cruise condition providing the cruise shape profile. The upstream trailing edge skin and downstream trailing edge skin each transition responsive to the control signal to an austenitic phase. In the austenitic phase, the upstream trailing edge morphs to a takeoff profile 36b responsive to the control signal and the downstream trailing edge morphs to a reverse camber profile 46b responsive to the control signal. A command signal 142 is provided to a controller 140 for one of takeoff, cruise, windmill, reverse thrust, step 1904. The control signal 144 is issued from the controller to the heating elements 74, 60 associated with the upstream leading edge skin and upstream trailing edge skin responsive to the takeoff command signal, step 1906. The control signal 144 is issued from the controller 140 to the heating elements 76, 66 associated with the downstream leading edge skin and downstream tailing edge skin responsive to a windmill or reverse thrust command signal, step 1908. The controller 140 issues no control signal responsive to the cruise command allowing the upstream leading edge skin, downstream leading edge skin, upstream trailing edge skin and downstream trailing edge skin to remain in the martensitic phase, step 1910.

Having now described various implementations of the disclosure in detail as required by the patent statutes, those skilled in the art will recognize modifications and substitutions to the specific implementations disclosed herein. Such modifications are within the scope and intent of the following claims. Within the claims the terms "comprising", "including", "having" and "containing" are intended to be open and additional or equivalent elements may be present. As used herein "and" and "or" are mutually inclusive unless otherwise limited.

What is claimed is:

1. A variable geometry aerodynamic blade system comprising:
   a blade having a leading edge and a trailing edge, and a central core box in a central portion of the blade;
   at least one first shape memory alloy (SMA) component integrated in the blade for aerodynamic repositioning of the leading edge and at least one second SMA component for aerodynamic repositioning of the trailing edge, the at least one first SMA component comprising an upstream leading edge skin and a downstream leading edge skin extending from the core box and spaced by an insulating plenum, an upstream leading edge tip of the upstream leading edge skin and a downstream leading edge tip of the downstream leading edge skin meeting at an interface;
   at least one first heating element interacting with the upstream leading edge skin or the downstream leading edge skin to provide heating for transition between a martensitic phase and an austenitic phase of the at least one first SMA component, the upstream leading edge skin and downstream leading edge skin each having an unmorphed shape in the martensitic phase for a cruise condition to provide a cruise shape profile, the upstream leading edge skin or the downstream leading edge skin each to transition to the austenitic phase to alter a camber of the leading edge blade responsive to a control signal;
   at least one second heating element interacting with the at least one second shape memory alloy component to provide heating for transition of the at least one second shape memory alloy component between a martensitic and an austenitic phase of the at least one second SMA component, the at least one second SMA component responsive to the at least one second heating element to alter a camber of the trailing edge of the blade responsive to the control signal; and
   a controller operatively engaged to the at least one first heating element and the at least one second heating element, the controller configured to receive a command signal and to output the control signal to one or both of the at least one first and at least one second heating elements responsive to the command signal, the camber of the leading edge being separately controllable from the camber of the trailing edge.

2. The variable geometry aerodynamic blade system as defined in claim 1 wherein the at least one second SMA component comprises an upstream trailing edge skin of a formed SMA plate extending from the core box and terminating in an upstream trailing edge, a downstream trailing edge skin of a formed SMA plate extending from the core box and terminating in a downstream trailing edge, the upstream trailing edge skin and the downstream trailing edge skin each having the martensitic phase with an unmorphed shape for the cruise condition to provide the cruise shape profile, the upstream trailing edge and downstream trailing edge each transitioning responsive to the control signal to the austenitic phase.

3. The variable geometry aerodynamic blade system as defined in claim 2 wherein the upstream trailing edge and the downstream trailing edge meet in sliding contact.

4. The variable geometry aerodynamic blade system as defined in claim 2 wherein the transition to the austenitic phase morphs the upstream trailing edge skin to a pretrained shape to provide a takeoff profile.

5. The variable geometry aerodynamic blade system as defined in claim 2 wherein the transition to the austenitic phase morphs the downstream trailing edge skin to a pretrained shape to provide a windmill profile.

6. The variable geometry aerodynamic blade system as defined in claim 2 wherein the at least one first heating element comprises a first plurality of heating elements to engage the upstream leading edge skin and a second plurality of heating elements to engage the downstream leading edge skin.

7. The variable geometry aerodynamic blade system as defined in claim 6 wherein the at least one second heating element comprises a third plurality of heating elements to engage the upstream trailing edge skin and a fourth plurality of heating elements to engage the downstream trailing edge skin.

8. The variable geometry aerodynamic blade system as defined in claim 1 wherein transition to the austenitic phase morphs the upstream leading edge skin to a pretrained shape to provide a takeoff profile.

9. The variable geometry aerodynamic blade system as defined in claim 1 wherein transition to the austenitic phase morphs the downstream leading edge skin to a pretrained shape to provide a windmill profile.

10. The variable geometry aerodynamic blade system as defined in claim 1 wherein the at least one first heating element comprises a first plurality of heating elements associated with the upstream leading edge skin and a second plurality of heating elements associated with the downstream leading edge skin.

11. The variable geometry aerodynamic blade system as defined in claim 1 wherein the command signal is a position command for takeoff, cruise, windmill, reverse thrust or failure mitigation.

12. The variable geometry aerodynamic blade system as defined in claim 1 wherein the at least one second SMA component comprises an upstream trailing edge skin and a downstream trailing edge skin extending from the core box spaced by a second insulating plenum, the upstream trailing edge skin and downstream trailing edge skin each having the martensitic phase with an unmorphed shape for the cruise condition to provide the cruise shape profile, the upstream trailing edge or the downstream trailing edge transitioning to the austenitic phase responsive to the control signal, wherein the downstream trailing edge skin is urged in bending by sliding contact during austenitic transition of the upstream trailing edge to conform to a desired takeoff profile and the upstream trailing edge skin is urged in bending by sliding contact of the downstream trailing edge to conform to a desired reverse camber profile during austenitic transition of the downstream trailing edge.

13. The variable geometry aerodynamic blade system as defined in claim 12 wherein the at least one second heating element comprises a third plurality of heating elements to engage the upstream trailing edge skin and a fourth plurality of heating elements to engage the downstream trailing edge skin.

14. The variable geometry aerodynamic blade system as defined in claim 12 wherein transition to the austenitic phase morphs the upstream trailing edge skin to a pretrained shape to provide the desired takeoff profile.

15. The variable geometry aerodynamic blade system as defined in claim 12 wherein transition to the austenitic phase morphs the downstream trailing edge skin to a pretrained shape to provide the desired reverse camber profile.

16. A method for aerodynamic blade geometry modification comprising:
rotating a blade having
a core box in a central portion of the blade and a leading edge and a trailing edge;
at least one first shape memory alloy (SMA) component integrated in the blade for aerodynamic repositioning of the leading edge and at least one second SMA component for aerodynamic repositioning of the trailing edge, the at least one first SMA component comprising an upstream leading edge skin and a downstream leading edge skin extending from the core box and spaced by an insulating plenum, an upstream leading edge tip of the upstream leading edge skin and a downstream leading edge tip of the downstream leading edge skin meeting at an interface;
a first plurality of heating elements associated with the upstream leading edge skin and a second plurality of heating elements associated with the downstream leading edge skin to provide heating for transition between a martensitic phase and an austenitic phase of the at least one first SMA component, the upstream leading edge skin and the downstream leading edge skin each having an unmorphed shape in the martensitic phase for a cruise condition to provide a cruise shape profile, the upstream leading edge skin or the downstream leading edge skin each to transition to the austenitic phase to alter a camber of the leading edge blade responsive to a control signal;
a third plurality of heating elements to engage a SMA upstream trailing edge skin and a fourth plurality of heating elements to engage a SMA downstream trailing edge skin to provide heating for transition between a martensitic phase and an austenitic phase of the SMA upstream trailing edge skin and the SMA downstream trailing edge skin responsive to the control signal;
providing a command signal to a controller for one of takeoff, cruise, or windmill or reverse thrust;
issuing the control signal from the controller to the first plurality of heating elements and the third plurality of heating elements responsive to the takeoff command signal, said SMA upstream leading edge skin and said SMA upstream trailing edge skin morphing in the austenitic phase to a positive camber position and producing a takeoff profile; and,
issuing the control signal from the controller to the second plurality of heating elements responsive to the windmill command signal; and,
issuing the control signal from the controller to the second plurality of heating elements and fourth plurality of heating elements responsive to the reverse thrust signal.

17. The variable geometry aerodynamic blade system comprising:
a blade having a core box in a central portion of the blade and a leading edge and a trailing edge;
at least one first shape memory alloy (SMA) component integrated in the blade for aerodynamic repositioning of the leading edge and at least one second SMA component for aerodynamic repositioning of the trailing edge;
the at least one first SMA component comprising an upstream leading edge skin and a downstream leading edge skin extending from the core box spaced by an insulating plenum, an upstream leading edge tip of the upstream leading edge skin and a downstream leading edge tip of the downstream leading edge skin meeting at an interface, and
a first plurality of heating elements associated with the upstream leading edge skin and a second plurality of heating elements associated with the downstream leading edge skin to provide heating for transition between a martensitic phase and an austenitic phase of the at least one first SMA component, the upstream leading edge skin and downstream leading edge skin each having an unmorphed shape in the martensitic phase for a cruise condition to provide a cruise shape profile, the upstream leading edge skin or the downstream leading edge skin each to transition to the austenitic phase to alter a camber of the leading edge blade responsive to a control signal, and
the at least one second SMA component comprising an upstream trailing edge skin and a downstream trailing edge skin extending from the core box spaced by a second insulating plenum, the upstream trailing edge skin and downstream trailing edge skin each having an unmorphed shape for the cruise condition to provide the cruise shape profile, the upstream trailing edge and the downstream trailing edge each to transition to an austenitic phase of the at least one second SMA component responsive to the control signal, wherein the downstream trailing edge skin is urged in bending by sliding contact during austenitic transition of the upstream trailing edge to conform to a desired takeoff profile and the upstream trailing edge skin is urged in bending by sliding contact of the downstream trailing edge to conform to a desired reverse camber profile during austenitic transition of the downstream trailing edge, and a third plurality of heating elements to engage the upstream trailing edge skin and a fourth plurality of heating elements to engage the downstream trailing edge skin to provide heating for a transition between a martensitic phase and the austenitic phase of the at least one second SMA component responsive to the control signal, and a controller configured to output the control signal to the first plurality of heating elements and third plurality of heating elements to achieve a takeoff position or the second plurality of heating elements to achieve a windmilling position or the fourth plurality of heating elements to achieve a reverse camber position.

18. The variable geometry aerodynamic blade system as defined in claim 17 wherein the controller is configured to respond to a command signal as a position command for takeoff, cruise, windmill, reverse thrust or failure mitigation.

* * * * *